United States Patent
Lee et al.

(10) Patent No.: US 11,981,455 B2
(45) Date of Patent: May 14, 2024

(54) MOBILITY VEHICLE TRANSFER PLATFORM

(71) Applicants: Hyundai Motor Company, Seoul (KR); Kia Corporation, Seoul (KR)

(72) Inventors: Sang Heon Lee, Seoul (KR); Dong Eun Cha, Hwaseong-Si (KR); Jin Ho Hwang, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 200 days.

(21) Appl. No.: 17/693,736

(22) Filed: Mar. 14, 2022

(65) Prior Publication Data
US 2022/0396375 A1 Dec. 15, 2022

(30) Foreign Application Priority Data
Jun. 9, 2021 (KR) .................. 10-2021-0075032

(51) Int. Cl.
*B64F 1/36* (2024.01)
*B60F 5/00* (2006.01)
(Continued)

(52) U.S. Cl.
CPC ............... *B64F 1/36* (2013.01); *B60F 5/00* (2013.01); *B60K 1/04* (2013.01); *B64D 9/00* (2013.01);
(Continued)

(58) Field of Classification Search
CPC ..... B64F 1/36; B60F 5/00; B60F 5/02; B60K 1/04; B60K 2001/0438; B64D 9/00; B60L 58/12
See application file for complete search history.

(56) References Cited

U.S. PATENT DOCUMENTS

2020/0023999 A1* 1/2020 Chae .................. B60L 53/66
2020/0055594 A1* 2/2020 Tal ..................... B64C 37/00
(Continued)

FOREIGN PATENT DOCUMENTS

JP            7143122 B2 *  9/2022
KR   10-2005-0110171       11/2005
(Continued)

OTHER PUBLICATIONS

Machine translation of Kajiwara et al. (JP Patent No. 7,143,122 B2) Pub date Sep. 28, 22 (Year: 2022).*

*Primary Examiner* — Rodney A Bonnette
(74) *Attorney, Agent, or Firm* — MORGAN, LEWIS & BOCKIUS LLP (57) ABSTRACT

A mobility vehicle transfer platform includes an elevation passage provided in a structure provided with a take-off and landing site for an air mobility vehicle and having an internal space extending in the vertical direction to be connected to the take-off and landing site and to allow a ground mobility vehicle to be elevated or lowered through the internal space to be connected to or separated from the air mobility vehicle, and an elevation unit provided in the internal space of the elevation passage, having an elevation portion selectively connected to the ground mobility vehicle and configured for elevating or lowering the ground mobility vehicle in the elevation passage when the ground mobility vehicle is connected to the elevation portion.

18 Claims, 3 Drawing Sheets

(51) Int. Cl.
  *B60K 1/04*   (2019.01)
  *B60L 58/12*  (2019.01)
  *B64D 9/00*   (2006.01)

(52) U.S. Cl.
  CPC ....... *B60K 2001/0438* (2013.01); *B60L 58/12* (2019.02)

(56) References Cited

U.S. PATENT DOCUMENTS

2020/0398731 A1*  12/2020  Glatfelter ............... B64D 11/00
2021/0061457 A1    3/2021  Hirabayashi et al.
2022/0041280 A1*   2/2022  Tian .................... B64C 29/0025
2022/0081851 A1*   3/2022  Elreich .................. G08G 7/00
2023/0001756 A1*   1/2023  Hwang .................... B60F 5/02

FOREIGN PATENT DOCUMENTS

KR    10-2036719    10/2019
KR    10-2119424     6/2020

* cited by examiner

MOBILITY VEHICLE TRANSFER PLATFORM

CROSS-REFERENCE TO RELATED APPLICATION

The present application claims priority to Korean Patent Application No. 10-2021-0075032, filed on Jun. 9, 2021, the entire contents of which is incorporated herein for all purposes by this reference.

BACKGROUND OF THE INVENTION

Field of the Invention

The present invention relates to a mobility vehicle transfer platform which utilizes a structure located in a downtown area as a transfer base for ground mobility vehicles driving on the ground and air mobility vehicles flying in the air, and thus allows a ground mobility vehicle to be elevated to a take-off and landing site on the roof of the structure through an elevation passage provided on the external wall of the structure and then to be connected to an air mobility vehicle to fly to a destination.

Description of Related Art

Conventional vehicles correspond to a basic transportation mean which a driver directly drives to reach a desired destination through driving on the ground. However, due to recent development of autonomous driving technology and various mobility vehicles thereby, the concept of rapid and efficient movement over a long distance using various mobility vehicles other than movement to a desired destination using each mobility vehicle is provided.

Mobility vehicles refer to ground mobility vehicles driving on the ground, air mobility vehicles flying in the air, marine mobility vehicles sailing on the sea, etc., and thereamong, the ground mobility vehicles have the concept of conventional vehicles and may thus be used on conventional roads, but even when the air mobility vehicles may vertically take off and land, there are many restrictions on takeoff and landing of the air mobility vehicles on the ground in a downtown area in which a lot of structures are concentrated. Therefore, passengers may board and exit the air mobility vehicles at a take-off and landing site on the roof of a structure in a downtown area.

Furthermore, while the ground mobility vehicles may be used to move over a comparatively short distance, the air mobility vehicles may be used to move over a comparatively long distance, and when a user generally using a ground mobility vehicle transfers to an air mobility vehicle, the user exits the ground mobility vehicle and moves directly to the take-off and landing site provided on the roof of the structure to board the air mobility vehicle, and thus feels inconvenienced.

Therefore, a mobility vehicle transfer platform, which, when a user utilizes both a ground mobility vehicle and an air mobility vehicle in a downtown area, allows the user moving using one kind of mobility vehicle to transfer to another kind of mobility vehicle in an easy and simple manner to rapidly and efficiently move to a desired destination and to allow the air mobility vehicle to smoothly take off and land, is required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a mobility vehicle transfer platform which utilizes a structure located in a downtown area as a transfer base for ground mobility vehicles driving on the ground and air mobility vehicles flying in the air, and thus allows a ground mobility vehicle to be elevated to a take-off and landing site on the roof of the structure through an elevation passage provided on the external wall of the structure and then to be connected to an air mobility vehicle to fly to a destination, and thereby allows a user in the ground mobility vehicle to conveniently transfer to the air mobility vehicle to rapidly move over a long distance and enables effective power management through power exchange between the ground mobility vehicle and the air mobility vehicle.

In accordance with various aspects of the present invention, the above and other objects may be accomplished by the provision of a mobility vehicle transfer platform an elevation passage provided in a structure provided with a take-off and landing site for an air mobility vehicle and having an internal space extending in a vertical direction to be connected to the take-off and landing site and to allow a ground mobility vehicle to be elevated or lowered through the internal space to be connected to or separated from the air mobility vehicle, and an elevation unit provided in the internal space of the elevation passage, having an elevation portion selectively connected to the ground mobility vehicle and configured for elevating or lowering the ground mobility vehicle in the elevation passage when the ground mobility vehicle is connected to the elevation portion.

The elevation passage may be provided to extend along an external wall of the structure, an upper end portion of the internal space may be connected to the take-off and landing site, and a lower end portion of the internal space may be connected to ground.

The take-off and landing site for the air mobility vehicle may be provided on a roof of the structure, and an upper end portion of the internal space of the elevation passage may be bent towards an upper surface of the roof so that the ground mobility vehicle elevated through the elevation unit reaches the take-off and landing site through the bent upper end portion of the internal space of the elevation passage.

The elevation portion may be provided on a lower surface of the elevation unit, a coupling portion may be provided at an upper end portion of the ground mobility vehicle, and the ground mobility vehicle may be connected to the elevation portion of the elevation unit or the air mobility vehicle by the coupling portion.

The coupling portion of the ground mobility vehicle may be connected to the elevation portion of the elevation unit or the air mobility vehicle in an electromagnetic manner or a rail manner.

The ground mobility vehicle may include a floor portion configured to drive on ground and a cabin room connected to an upper end portion of the floor portion so that passengers enter the cabin room, and the floor portion and the cabin room may be separably connected to each other.

The air mobility vehicle may take off or land at the take-off and landing site in a state in which the floor portion and the cabin room of the ground mobility vehicle are connected to the air mobility vehicle, or in a state in which the cabin room separated from the floor portion is connected to the air mobility vehicle.

A battery for driving may be provided in the floor portion of the ground mobility vehicle, and the ground mobility vehicle may exchange power with the elevation unit or the air mobility vehicle when the ground mobility vehicle is connected to the elevation portion of the elevation unit or the air mobility vehicle.

The mobility vehicle transfer platform may further include a controller configured to control the ground mobility vehicle to be connected to or released from the elevation portion and to be elevated or lowered through the elevation unit, when the ground mobility vehicle enters the elevation passage.

The mobility vehicle transfer platform may further include a controller configured, in response to a request for allocation of the air mobility vehicle from a user, to allocate the air mobility vehicle to a take-off and landing site closest to a user's requested point and to control the ground mobility vehicle in which the user is accommodated to be elevated to the take-off and landing site through the elevation passage and then to be connected to the air mobility vehicle.

The controller may collect destination information of the ground mobility vehicle in which the user is accommodated, may determine a section configured so that the ground mobility vehicle is connected to the air mobility vehicle and the air mobility vehicle provided with the ground mobility vehicle combined therewith flies, and a section configured so that the ground mobility vehicle drives after the air mobility vehicle lands, based on the destination information, and may control the air mobility vehicle and the ground mobility vehicle to fly and drive in the determined sections.

The controller may detect a state of charge (SOC) value of a battery of the ground mobility vehicle or the air mobility vehicle before the air mobility vehicle starts flight, and may control the battery of the ground mobility vehicle or the air mobility vehicle to be charged or replaced with a new battery when the detected state of charge of the battery is not enough for the ground mobility vehicle or the air mobility vehicle to drive or fly to a destination.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
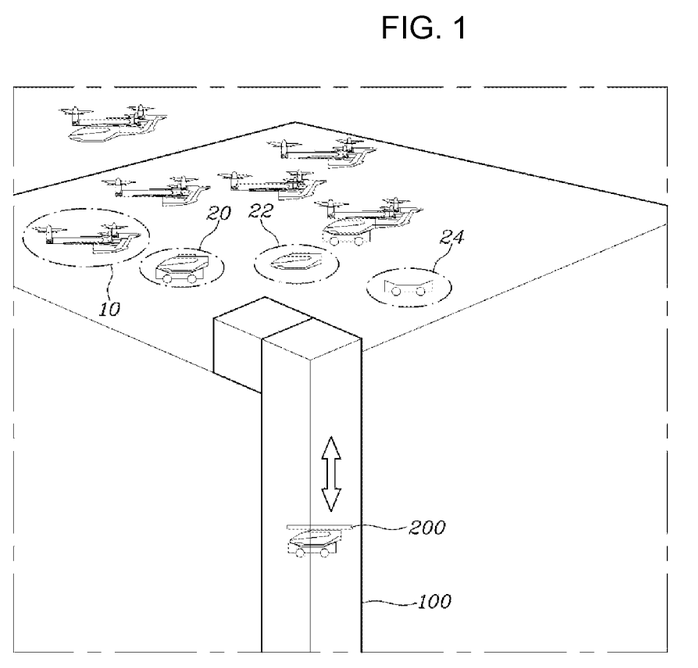
FIG. 1 is a perspective view of a mobility vehicle transfer platform according to various exemplary embodiments of the present invention.
Figure 2:
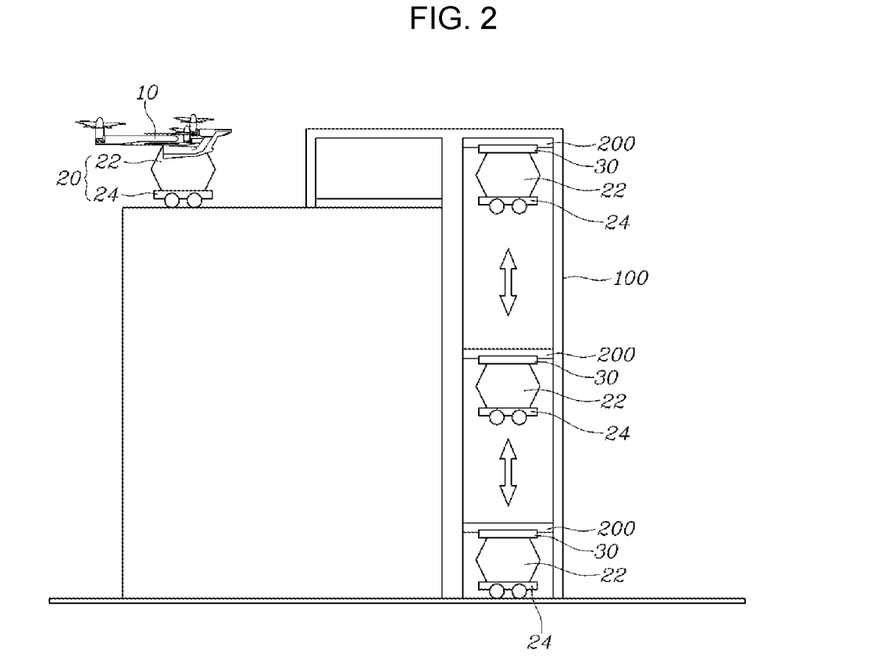
FIG. 2 is a side view of the mobility vehicle transfer platform according to various exemplary embodiments of the present invention.
Figure 3:
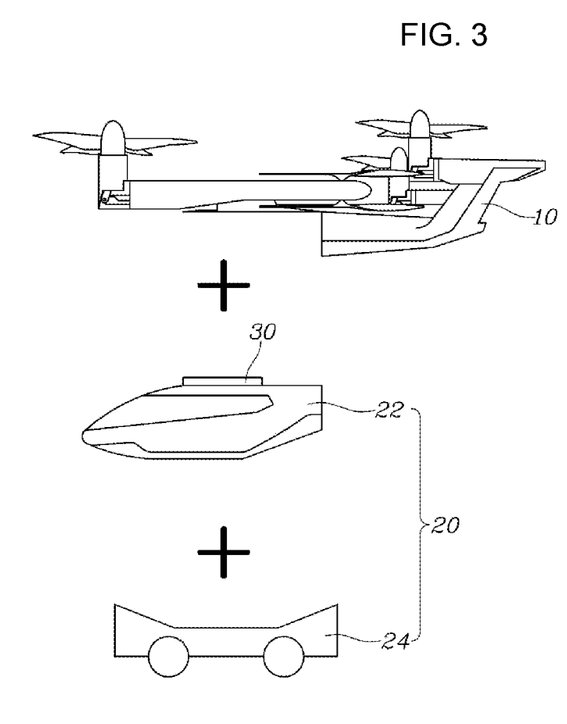
FIG. 3 is a view exemplarily illustrating an air mobility vehicle and a ground mobility vehicle used in the mobility vehicle transfer platform according to various exemplary embodiments of the present invention.

FIG. 1 is a perspective view of a mobility vehicle transfer platform according to various exemplary embodiments of the present invention, FIG. 2 is a side view of the mobility vehicle transfer platform according to various exemplary embodiments of the present invention, and FIG. 3 is a view exemplarily illustrating an air mobility vehicle and a ground mobility vehicle used in the mobility vehicle transfer platform according to various exemplary embodiments of the present invention.

A controller according to various exemplary embodiments of the present invention may be implemented through a non-volatile memory configured to store an algorithm configured to control operations of various elements of a vehicle or data regarding software commands for reproducing the algorithm and a processor configured to perform operations which will be described below using data stored in the corresponding memory. The memory and the processor may be implemented as individual chips. Alternatively, the memory and the processor may be implemented as a single integrated chip. Here, the processor may be provided in a form of one or more processors.

FIG. 1 is a perspective view of a mobility vehicle transfer platform according to various exemplary embodiments of the present invention, and FIG. 2 is a side view of the mobility vehicle transfer platform according to various exemplary embodiments of the present invention. The mobility vehicle transfer platform according to various exemplary embodiments of the present invention includes an elevation passage 100 provided in a structure provided with a take-off and landing site for an air mobility vehicle 10 and having an internal space extending in the vertical direction to be connected to the take-off and landing site and to allow a ground mobility vehicle 20 to be elevated or lowered through the internal space to be connected to or separated from the air mobility vehicle 10, and an elevation unit 200 provided in the internal space of the elevation passage 100 and configured to have an elevation portion connected to the ground mobility vehicle 20 and to elevate or lower the ground mobility vehicle 20 in the elevation passage 100 when the ground mobility vehicle 20 is connected to the elevation portion.

Furthermore, in the mobility vehicle transfer platform according to various exemplary embodiments of the present invention, the elevation passage 100 may be provided to extend along the external wall of the structure, the upper end portion of the internal space may be connected to the take-off and landing site, and the lower end portion of the internal space may be connected to the ground. In the mobility vehicle transfer platform according to various exemplary embodiments of the present invention, the take-off and landing site for the air mobility vehicle 10 may be provided on the roof of the structure, and the upper end portion of the internal space of the elevation passage 100 may be bent toward the upper surface of the roof so that the ground mobility vehicle 20 elevated through the elevation unit 200 may reach the take-off and landing site.

Here, the air mobility vehicle 10, which does not have a passenger cabin, may be provided to fly together with the ground mobility vehicle 20 by towing the ground mobility vehicle 20, and may vertically take off and land to take off and land at the take-off and landing site provided on the roof of the high-rise structure without any restraints in a downtown area in which structures are concentrated.

The mobility vehicle transfer platform according to various exemplary embodiments of the present invention may elevate and lower the ground mobility vehicle 20 through the external wall of an existing structure without constructing any separate structure for providing the mobility vehicle transfer platform, allowing a user to conveniently and effectively use the ground mobility vehicle 20 and the air mobility vehicle 10.

Furthermore, the user of the mobility vehicle transfer platform according to various exemplary embodiments of the present invention may conveniently move to the take-off and landing site through the elevation passage 100 in the state in which the user is accommodated in the ground mobility vehicle 20, the ground mobility vehicle 20 is directly connected to the air mobility vehicle 10, the air mobility vehicle 10 provided with the ground mobility vehicle 20 combined therewith takes off or lands, eliminating user inconvenience of exiting the ground mobility vehicle 20 and then transferring to the air mobility vehicle 10.

In the mobility vehicle transfer platform according to various exemplary embodiments of the present invention, the elevation portion may be provided on the lower surface of the elevation unit 200, a coupling portion 30 may be provided at the upper end portion of the ground mobility vehicle 20, and the ground mobility vehicle 20 may be connected to the elevation portion of the elevation unit 200 or the air mobility vehicle 10 by the coupling portion 30.

Furthermore, in the mobility vehicle transfer platform according to various exemplary embodiments of the present invention, the coupling portion 30 of the ground mobility vehicle 20 may be connected to the elevation portion of the elevation unit 200 or the air mobility vehicle 10 in an electromagnetic manner, a rail manner or the like.

Concretely, in the mobility vehicle transfer platform according to various exemplary embodiments of the present invention, the coupling portion 30 for coupling to the elevation portion of the elevation unit 200 or the air mobility vehicle 10 may be provided at the upper end portion of the ground mobility vehicle 20, and the ground mobility vehicle 20 may be conveniently and rapidly connected to the elevation unit 200 required to elevate and lower the ground mobility vehicle 20 and the air mobility vehicle 10 for takeoff and landing, using one element, i.e., the coupling portion 20.

In the mobility vehicle transfer platform according to various exemplary embodiments of the present invention, the elevation portion is configured to set a reference point on the lower surface of the elevation unit 200 to prevent the ground mobility vehicle 20 from colliding with the internal wall of the elevation passage 100 when the ground mobility vehicle 20 is connected to the elevation unit 200, and the elevation portion together with the coupling portion 30 is configured to more securely fix the ground mobility vehicle 20. That is, the elevation unit 200 is configured to move the ground mobility vehicle 20 along the elevation passage 100, and the elevation portion is configured to fix the ground mobility vehicle 20 to the lower surface of the elevation unit 200.

Here, although the elevation portion and the coupling portion 30 may exemplarily be connected to each other in the electromagnetic manner, a rail manner or the like, various other combination manners in which the ground mobility vehicle 20 and the elevation unit 200 may be securely and rapidly fixed to or separated from each other may be employed.

FIG. 3 is a view exemplarily illustrating an air mobility vehicle and a ground mobility vehicle used in the mobility vehicle transfer platform according to various exemplary embodiments of the present invention. In the ground mobility vehicle used in the mobility vehicle transfer platform according to various exemplary embodiments of the present invention, the ground mobility vehicle 20 may include a floor portion 24 configured to drive on the ground and a cabin room 22 connected to the upper end portion of the floor portion 24 such that passengers enter the cabin room 22, and the floor portion 24 and the cabin room 22 may be separably connected to each other.

Furthermore, in the mobility vehicle transfer platform according to various exemplary embodiments of the present invention, the air mobility vehicle 10 may take off or land at the take-off and landing site in the state in which both the floor portion 24 and the cabin room 22 of the ground mobility vehicle 20 are connected to the air mobility vehicle 10, or in the state in which the cabin room 22 separated from the floor portion 24 is connected to the air mobility vehicle 10.

Concretely, in the mobility vehicle transfer platform according to various exemplary embodiments of the present invention, because the ground mobility vehicle 20 is configured so that the cabin room 22 which passengers enter and the floor portion 24 configured to drive on the ground are separated from each other, the cabin room 22 and the floor portion 24 may be separated from or connected to each other, as needed, and may thus have high utilization and be separately repaired when each thereof needs to be repaired.

In the mobility vehicle transfer platform according to various exemplary embodiments of the present invention, when the user in the cabin room 22 desires to transfer to the air mobility vehicle 10, the user does not get out of the ground mobility vehicle 10 to get into the air mobility vehicle 20, and the entirety of the cabin room 22 in which the user is accommodated may be connected to the air mobility vehicle 10, allowing the user to more rapidly transfer between two kinds of vehicles without entering and existing these vehicles.

Furthermore, in the mobility vehicle transfer platform according to various exemplary embodiments of the present invention, a high voltage battery for driving may be provided in the floor portion 24 of the ground mobility vehicle 20, and the ground mobility vehicle 20 may exchange power with the elevation unit 200 or the air mobility vehicle 10 when the ground mobility vehicle 20 is connected to the elevation portion of the elevation unit 200 or the air mobility vehicle 10.

That is, in the mobility vehicle transfer platform according to various exemplary embodiments of the present invention, because the high voltage battery for driving may be provided in the floor portion 24 of the ground mobility vehicle 20, when battery power is insufficient, not only the battery may be charged but also the floor portion 24 may be replaced with a new battery in the state in which the user is in the cabin room 22 to solve insufficiency in battery power, and when the air mobility vehicle 10 is connected to the ground mobility vehicle 20, the air mobility vehicle 10 may be conductively connected to the battery provided in the floor portion 24 as well as to a separate battery to supplement insufficient power during flying, being configured for achieving simple and effective power management throughout the mobility vehicle transfer platform.

The mobility vehicle transfer platform according to various exemplary embodiments of the present invention may further include a controller configured to control the ground mobility vehicle 20 to be connected to or released from the elevation portion and to be elevated or lowered through the elevation unit 200, when the ground mobility vehicle 20 enters the elevation passage 100.

Furthermore, the mobility vehicle transfer platform according to various exemplary embodiments of the present invention may further include a controller configured, when there is a request for allocation of an air mobility vehicle 10 from a user, to allocate the air mobility vehicle 10 to a take-off and landing site closest to a user's requested point and to control the ground mobility vehicle 10 in which the user is accommodated to be elevated to the take-off and landing site through the elevation passage 100 of a corresponding structure and then to be connected to the air mobility vehicle 10.

Furthermore, in the mobility vehicle transfer platform according to various exemplary embodiments of the present invention, the controller may collect destination information of the ground mobility vehicle 20 in which the user is accommodated, may determine a section, in which the ground mobility vehicle 20 is connected to the air mobility vehicle 10 and the air mobility vehicle 10 provided with the ground mobility vehicle 20 combined therewith flies, and a section, in which the ground mobility vehicle 20 drives after the air mobility vehicle 10 lands, based on the destination information, and may control the air mobility vehicle 10 and the ground mobility vehicle 20 to fly and drive in the determined sections.

Furthermore, in the mobility vehicle transfer platform according to various exemplary embodiments of the present invention, the controller may detect the state of charge of the battery of the ground mobility vehicle 20 or the air mobility vehicle 10 before the air mobility vehicle 10 starts flight, and may control the battery of the ground mobility vehicle 20 or the air mobility vehicle 10 to be charged or replaced with a new battery when the detected state of charge of the battery is not enough for the ground mobility vehicle 20 or the air mobility vehicle 10 to drive or fly to a destination.

The mobility vehicle transfer platform according to various exemplary embodiments of the present invention may control transfer between the ground mobility vehicle 20 and the air mobility vehicle 10 through the controller, and may thus allow a mobility vehicle to rapidly and effectively reach a destination when there is a mobility vehicle request from a user.

Concretely, when destination information is input by the user, the controller may set an optimized path by determining which one of the ground mobility vehicle 20 and the air mobility vehicle 10 is used in each of respective sections up to the destination.

After the path is set, the controller may allocate the ground mobility vehicle 20 to the current position of the user to control the ground mobility vehicle 20 in which the user is accommodated to be moved to the mobility vehicle transfer platform, and may control the ground mobility vehicle 20 in which the user is accommodated to be moved to the take-off and landing site through the elevation passage 100 of the mobility vehicle transfer platform, the ground mobility vehicle 20 in which the user is accommodated may be finally connected to the air mobility vehicle 10 allocated to the take-off and landing site, and the air mobility vehicle 10 provided with the ground mobility vehicle 20 combined therewith may fly to a desired next take-off and landing site.

Thereafter, also in the same manner, when the air mobility vehicle 10 lands, the controller may be configured to control the ground mobility vehicle 20 in which the user is accommodated to be lowered to the ground through the elevation passage 100 of the mobility vehicle transfer platform, and the lowered ground mobility vehicle 20 may allow the user to finally reach the destination through driving on the ground.

As is apparent from the above description, a mobility vehicle transfer platform according to various exemplary embodiments of the present invention utilizes a structure located in a downtown area as a transfer base for ground mobility vehicles driving on the ground and air mobility vehicles flying in the air, and thus allows a ground mobility vehicle to be elevated to a take-off and landing site on the roof of the structure through an elevation passage provided on the external wall of the structure and then to be connected to an air mobility vehicle to fly to a destination, and thereby allows a user accommodated in the ground mobility vehicle to conveniently transfer to the air mobility vehicle to rapidly move over a long distance and enables effective power management through power exchange between the ground mobility vehicle and the air mobility vehicle.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobility vehicle transfer platform comprising:
an elevation passage provided in a structure having a take-off and landing site for an air mobility vehicle, and having an internal space extending in a vertical direction to be connected to the take-off and landing site and to allow a ground mobility vehicle to be elevated or lowered through the internal space to be connected to or separated from the air mobility vehicle; and
an elevation unit provided in the internal space of the elevation passage, having an elevation portion selectively connected to the ground mobility vehicle and configured for elevating or lowering the ground mobility vehicle in the elevation passage when the ground mobility vehicle is connected to the elevation portion,
wherein the elevation portion is provided on a lower surface of the elevation unit,
wherein a coupling portion is provided at an upper end portion of the ground mobility vehicle, and
wherein the ground mobility vehicle is connected to the elevation portion of the elevation unit or the air mobility vehicle by the coupling portion.

2. The mobility vehicle transfer platform of claim 1,
wherein the elevation passage is provided to extend along an external wall of the structure, an upper end portion of the internal space is connected to the take-off and landing site, and a lower end portion of the internal space is connected to ground along the vertical direction.

3. The mobility vehicle transfer platform of claim 1,
wherein the take-off and landing site for the air mobility vehicle is provided on a roof of the structure.

4. The mobility vehicle transfer platform of claim 3,
wherein an upper end portion of the internal space of the elevation passage is bent towards an upper surface of the roof so that the ground mobility vehicle elevated through the elevation unit reaches the take-off and landing site through the bent upper end portion of the internal space of the elevation passage.

5. The mobility vehicle transfer platform of claim 1,
wherein the coupling portion of the ground mobility vehicle is connected to the elevation portion of the elevation unit or the air mobility vehicle in an electromagnetic manner or a rail manner.

6. The mobility vehicle transfer platform of claim 1,
wherein the ground mobility vehicle includes a floor portion configured to drive on ground and a cabin room connected to an upper end portion of the floor portion so that passengers enter the cabin room.

7. The mobility vehicle transfer platform of claim 6,
wherein the floor portion and the cabin room are separably connected to each other.

8. The mobility vehicle transfer platform of claim 7,
wherein the air mobility vehicle is configured to take off or land at the take-off and landing site in a state in which the floor portion and the cabin room of the ground mobility vehicle are connected to the air mobility vehicle, or in a state in which the cabin room separated from the floor portion is connected to the air mobility vehicle.

9. The mobility vehicle transfer platform of claim 7,
wherein a battery for driving the ground mobility vehicle is provided in the floor portion of the ground mobility vehicle, and the ground mobility vehicle exchanges electrical power with the elevation unit or the air mobility vehicle when the ground mobility vehicle is connected to the elevation portion of the elevation unit or the air mobility vehicle.

10. The mobility vehicle transfer platform of claim 1, further including a controller configured to control the ground mobility vehicle to be connected to or released from the elevation portion and to be elevated or lowered through the elevation unit, when the ground mobility vehicle enters the elevation passage.

11. The mobility vehicle transfer platform of claim 1, further including a controller configured, in response to a request for allocation of the air mobility vehicle from a user, to allocate the air mobility vehicle to a take-off and landing site closest to a user's requested point and to control the ground mobility vehicle in which the user is accommodated to be elevated to the take-off and landing site through the elevation passage and then to be connected to the air mobility vehicle.

12. The mobility vehicle transfer platform of claim 11,
wherein the controller is configured to collect destination information of the ground mobility vehicle in which the user is accommodated, to determine a section configured so that the ground mobility vehicle is connected to the air mobility vehicle and the air mobility vehicle provided with the ground mobility vehicle combined therewith flies, and a section configured so that the ground mobility vehicle drives after the air mobility vehicle lands, based on the destination information, and to control the air mobility vehicle and the ground mobility vehicle to fly and drive in the determined sections.

13. The mobility vehicle transfer platform of claim 12, wherein the controller is configured to detect a state of charge (SOC) value of a battery of the ground mobility vehicle or the air mobility vehicle before the air mobility vehicle starts flight, and to control the battery of the ground mobility vehicle or the air mobility vehicle to be charged or replaced with a new battery when the detected state of charge of the battery is not enough for the ground mobility vehicle or the air mobility vehicle to drive or fly to a destination.

14. A method of controlling a mobility vehicle transfer platform having an elevation passage and an elevation unit including an elevation portion, the method comprising:
controlling, by a controller, a ground mobility vehicle to be connected to or released from the elevation portion of the elevation unit and to be elevated or lowered through the elevation unit, when the ground mobility vehicle enters the elevation passage of the mobility vehicle transfer platform,
wherein the elevation portion is provided on a lower surface of the elevation unit,
wherein a coupling portion is provided at an upper end portion of the ground mobility vehicle, and
wherein the ground mobility vehicle is connected to the elevation portion of the elevation unit or an air mobility vehicle by the coupling portion.

15. The method of claim 14, further including:
in response to a request for allocation of the air mobility vehicle from a user, allocating, by the controller, the air mobility vehicle to a take-off and landing site closest to a user's requested point and to control the ground mobility vehicle in which the user is accommodated to be elevated to the take-off and landing site through the elevation passage and then to be connected to the air mobility vehicle.

16. The method of claim 15, further including:
collecting, by the controller, destination information of the ground mobility vehicle in which the user is accommodated,
determining, by the controller, a section configured so that the ground mobility vehicle is connected to the air mobility vehicle and the air mobility vehicle provided with the ground mobility vehicle combined therewith flies, and a section configured so that the ground mobility vehicle drives after the air mobility vehicle lands, based on the destination information, and
controlling, by the controller, the air mobility vehicle and the ground mobility vehicle to fly and drive in the determined sections.

17. The method of claim 16,
detecting, by the controller, a state of charge (SOC) value of a battery of the ground mobility vehicle or the air mobility vehicle before the air mobility vehicle starts flight, and
controlling, by the controller, the battery of the ground mobility vehicle or the air mobility vehicle to be charged or replaced with a new battery when the detected state of charge of the battery is not enough for the ground mobility vehicle or the air mobility vehicle to drive or fly to a destination.

18. A non-transitory computer readable storage medium on which a program for performing the method of claim 14 is recorded.

* * * * *